Patented Nov. 5, 1946

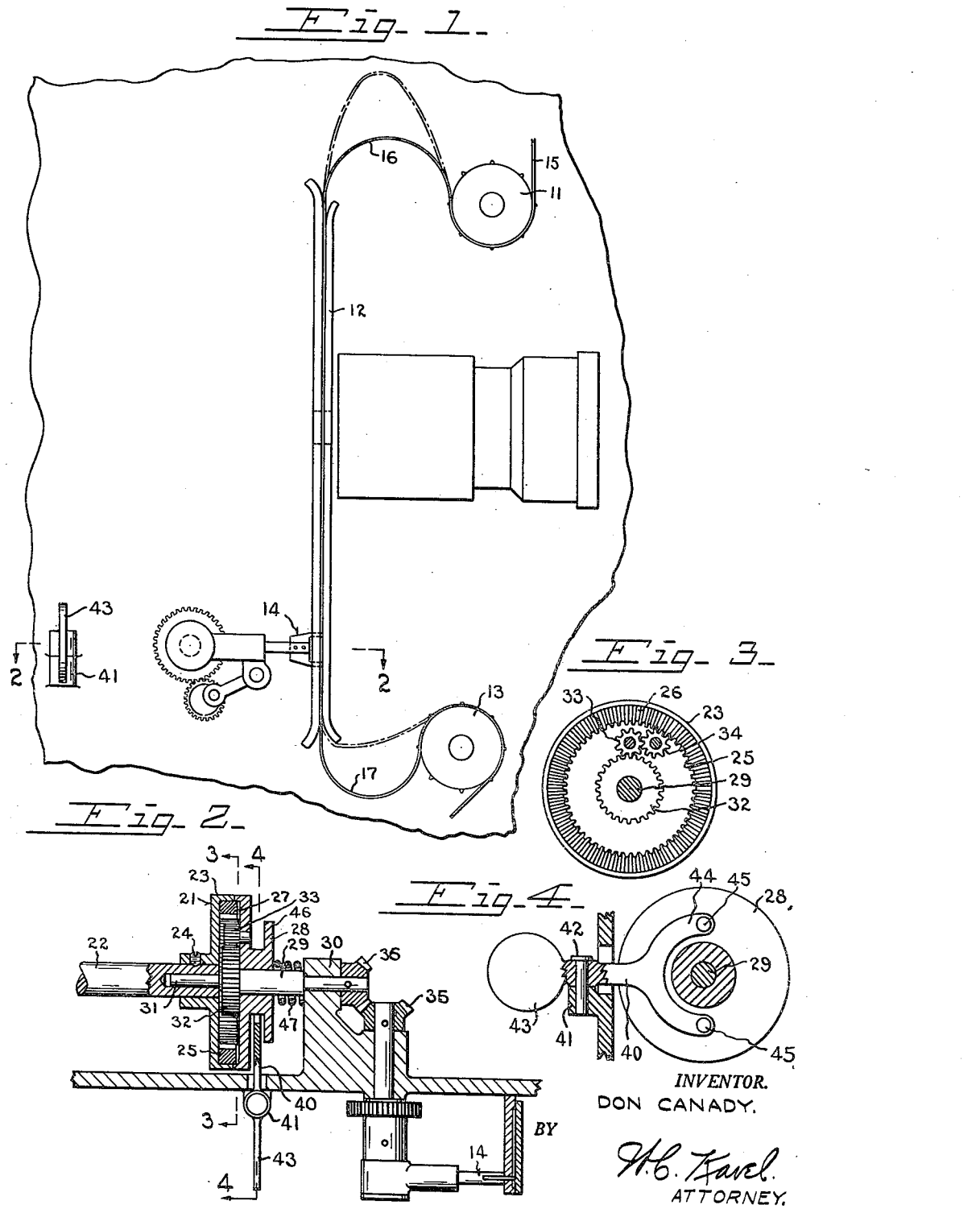

2,410,711

UNITED STATES PATENT OFFICE 2,410,711

MOTION PICTURE APPARATUS

Don Canady, Cleveland, Ohio, assignor to Dayton Acme Co., Cincinnati, Ohio, a corporation of Ohio Application September 25, 1944, Serial No. 555,690

2 Claims. (Cl. 88—18)

This invention relates to motion picture projectors and particularly to mechanism for restoring the film loop on projectors using a claw type intermittent feed mechanism.

The invention is directed to means for increasing the speed of the claw mechanism to restore the loop, between the gate and lower roller.

The object of my invention is to provide means to restore a lost loop on a projector while the machine is operating.

A further object is to provide a clutch mechanism to maintain the normal speed of the claw mechanism operable to increase the speed of the claw mechanism relative to the speed of the feeding rollers.

Still further objects reside in the novel construction of parts.

My invention will be further readily understood from the following description and claims and from the drawing, in which latter:

Fig. 1 is a side view of a portion of a projector incorporating my improvement.

Fig. 2 is a horizontal section of the same, taken in the plane of the line 2—2 of Fig. 1.

Fig. 3 is a transverse section, taken in the plane of the line 3—3 of Fig. 2, and Fig. 4 is a detail section, taken in the plane of the line 4—4 of Fig. 2.

The usual projector has an upper feed roller 11, a gate or pressure pad 12 and a lower feed roller 13. A claw mechanism 14 intermittently feeds the film 15, one frame at a time, past the projection aperture. It is essential that a loop 16 and a loop 17 be maintained between the constant feeding rollers 11 and 13 and the intermittent mechanism 14 to permit stoppage of the film at the aperture while the shutter is open.

If the film has defective feeding apertures and at times, for other reasons, the claw does not progress the film, the lower loop 17 disappears, enlarging the loop 16, causing unsatisfactory projection of the film and my improvement includes mechanism whereby the action of the claw is speeded up, without changing the speed of the feed rollers to advance the film between the feed rollers at an accelerated rate of speed to cause the loop 17 to enlarge to its normal size.

I accomplish this by providing a clutch and gear mechanism 21 on the shaft 22 which imparts movement to the claw and shutter.

The shaft 22 has a member 23 secured thereto as by a set screw 24 and has an internal ring gear 25 secured thereto. The exposed face of the gear is shown provided with clutch teeth 26 engageable with teeth 27 on a sliding member 28.

The member 28 is slidable on a shaft 29, which is journalled in a bearing 30 and has an extension 31 rotatable in the shaft 22. A gear 32 is integral with the shaft 29 and meshes with a gear 33 journalled in the member 28. A gear 34 meshes with the gear 33 and the ring gear 25.

The intermittent claw mechanism 14 is arranged to advance the film 15 one frame at a time being driven by a gear 35 meshing with a gear 36 on the shaft 29. The shutter which is not shown is also driven from the gear 36 to synchronize the shutter with the intermittent movement.

A clutch arm 40 is pivoted on a lug 41 by a pin 42 and has a finger portion 43 and a fork 44 having friction pads 45 thereon arranged to contact a flange 46 on the member 28. A spring 47 normally maintains the member 28 in clutching relation to the member 23.

In normal operation of the projector, the film 15 is fed through the gate 12 by the intermittent claw mechanism 14 with the feed rollers 11 and 13 constantly feeding the film either to the take-up reel or past the sound mechanism. If, due to imperfections in the film or for any other cause the lower loop 17 is lost and the film is drawn taut between the gate and the lower feed roller, the operator merely presses on the finger portion 43 moving the member 28 away from the member 23 disengaging the clutch teeth and applying a braking action on the member 28 which will cause the internal gears 34, and 33 to drive the gear 32 at an increased speed receiving its rotation from the ring gear 25, thus increasing the speed of the intermittent claw mechanism for increasing the speed of travel of the film between the feed rollers which rotate at the normal speed. As soon as the lower loop is restored the finger portion is released and the members 23 and 28 are again clutched together for normal operation of the projector.

Having thus fully described my invention, what I claim as new and desire to secure by Letters Patent is:

1. In a motion picture projector having an upper constant speed film feeding roller, a lower constant speed film feeding roller, an intermittent film feeding mechanism interposed between said feed rollers operating with a free loop between each of said feed rollers and the intermittent mechanism, and means for increasing the speed of the intermittent mechanism for restoring the lower film loop comprising a pair of members mounted on co-axial shafts, an internal gear fixed to one of said members, said member attached to one of said shafts, clutch teeth between said members, said other member rotatable on said other shaft, a gear fixed to said last named shaft, a pair of gears interposed between said last named gear and said internal gear for increasing the speed of said last named shaft upon disengagement of said clutch teeth.

2. In a motion picture projector having an upper constant speed film feeding roller, a lower constant speed film feeding roller, an intermittent film feeding mechanism interposed between said feed rollers, mechanism for increasing the speed of said intermittent film feeding mechanism including a pair of aligned shafts, a member fixed to one of said shafts, a member slidable on the other shaft, clutch teeth on said members for engaging said members, planetary gears interposed between one of said members and one of said shafts whereby upon separation and cessation of rotation of one of said members said last named shaft will have its speed increased.

DON CANADY.